United States Patent
Saruwatari

(10) Patent No.: US 8,689,768 B2
(45) Date of Patent: Apr. 8, 2014

(54) APPARATUS AND METHOD FOR CONTROLLING FUEL INJECTION OF INTERNAL COMBUSTION ENGINE

(75) Inventor: Masayuki Saruwatari, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 264 days.

(21) Appl. No.: 13/233,803

(22) Filed: Sep. 15, 2011

(65) Prior Publication Data

US 2012/0072093 A1    Mar. 22, 2012

(30) Foreign Application Priority Data

Sep. 22, 2010    (JP) .................................. 2010-211507

(51) Int. Cl.
F02B 31/08    (2006.01)
F02B 3/00    (2006.01)
F02D 41/30    (2006.01)

(52) U.S. Cl.
USPC ........... 123/299; 123/300; 123/302; 123/308; 123/431; 123/436; 123/491; 123/492; 123/576; 123/577

(58) Field of Classification Search
USPC ......... 123/299, 300, 308, 302, 436, 491, 492, 123/431, 575, 576, 577; 701/103, 110
See application file for complete search history.

(56) References Cited

U.S. PATENT DOCUMENTS 4,548,175 A * 10/1985 Kawai et al. .................. 123/308
5,050,557 A *  9/1991 Ishida et al. .................. 123/432
(Continued)

FOREIGN PATENT DOCUMENTS

JP    60-108544 A    6/1985
JP    5-133252 A    5/1993
(Continued)

OTHER PUBLICATIONS

Japanese Office Action dated Jul. 31, 2012 with an English translation.

*Primary Examiner* — Hai Huynh
(74) *Attorney, Agent, or Firm* — Crowell & Moring LLP

(57) ABSTRACT

The present invention relates to a fuel injection control apparatus for controlling fuel injection and a method therefor in an engine having first and second intake passages provided with first and second fuel injection valves, respectively. Fuel injection modes using the two injection valves include an alternative injection mode in which the first and second fuel injection valves are alternately operated every predetermined number of cycles and a combined injection mode in which both the first and second fuel injection valves are used for each cycle. Then, the combined injection mode is selected in a full load range. In a partial load range, the alternative injection mode is selected in a cold state and the combined injection mode is selected after warm-up. Accordingly, it is possible to reduce an equilibrium amount of adhering fuel to an inner wall of an intake passage.

21 Claims, 17 Drawing Sheets

(56) References Cited

U.S. PATENT DOCUMENTS

| | | | |
|---|---|---|---|
| 5,174,260 A * | 12/1992 | Nonogawa et al. | 123/432 |
| 5,553,580 A * | 9/1996 | Ganoung | 123/308 |
| 6,722,344 B2 * | 4/2004 | Ashida et al. | 123/432 |
| 6,742,495 B2 * | 6/2004 | Ashida et al. | 123/310 |
| 7,240,664 B2 * | 7/2007 | Yoshida et al. | 123/346 |
| 7,320,297 B2 * | 1/2008 | Kamio et al. | 123/1 A |
| 7,472,679 B2 * | 1/2009 | Yamashita et al. | 123/302 |
| 7,647,916 B2 * | 1/2010 | Leone et al. | 123/432 |
| 7,909,025 B2 * | 3/2011 | Pagot | 123/559.1 |
| 7,918,207 B2 * | 4/2011 | Pursifull et al. | 123/300 |
| 7,942,129 B2 * | 5/2011 | Pagot et al. | 123/432 |
| 8,027,777 B2 * | 9/2011 | Ichihara et al. | 701/103 |
| 8,281,766 B2 * | 10/2012 | Tomiita et al. | 123/432 |

FOREIGN PATENT DOCUMENTS

| | | |
|---|---|---|
| JP | 5-180049 A | 7/1993 |
| JP | 6-10804 A | 1/1994 |
| JP | 2001-159322 A | 6/2001 |
| JP | 2007-292058 A | 11/2007 |
| JP | 2009-185741 A | 8/2009 |
| JP | 2010-24994 A | 2/2010 |
| JP | 2010-38102 A | 2/2010 |

* cited by examiner

COOLING WATER TEMPERATURE TW

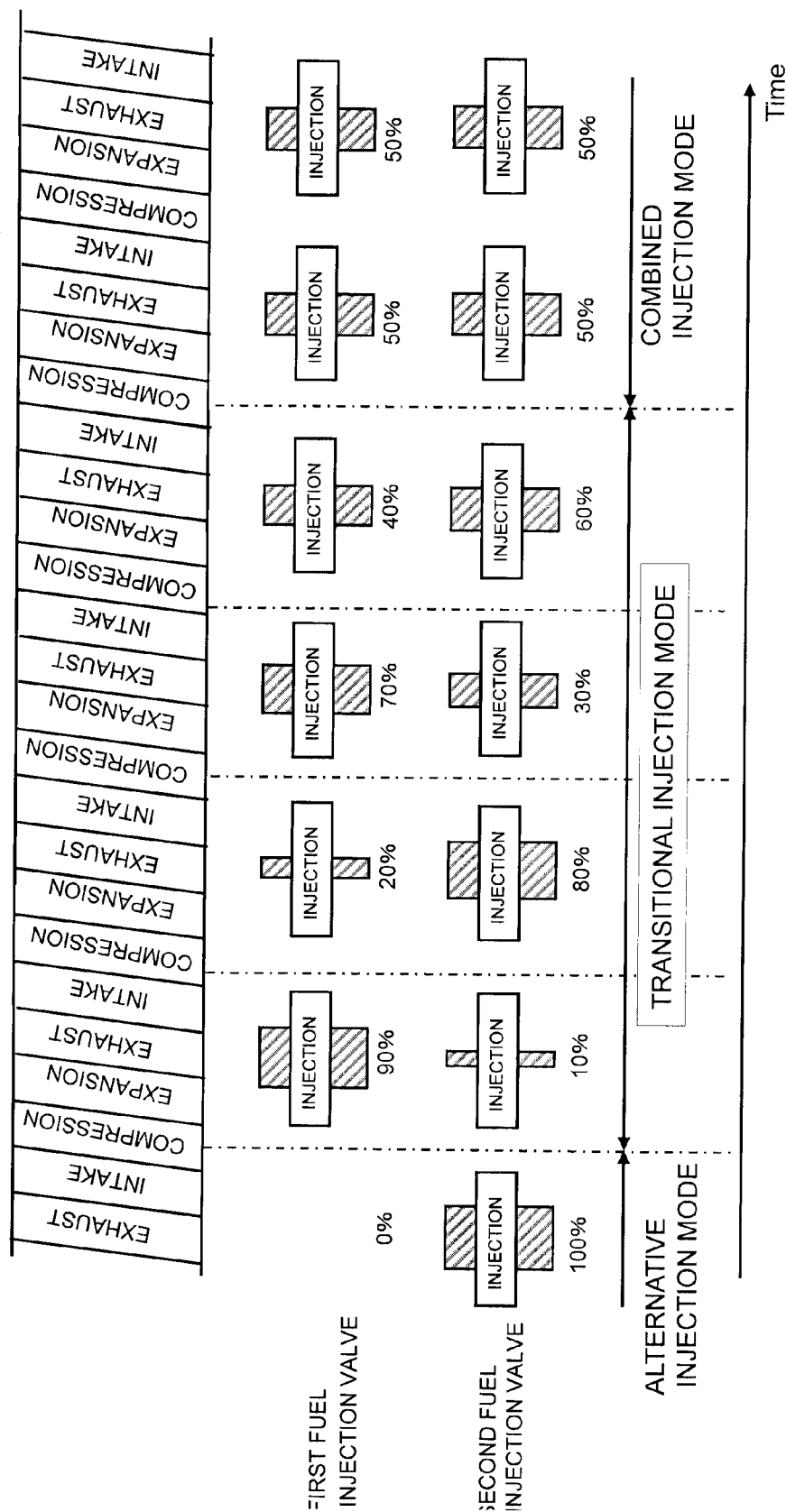

APPARATUS AND METHOD FOR CONTROLLING FUEL INJECTION OF INTERNAL COMBUSTION ENGINE

BACKGROUND OF THE INVENTION

1. Field of the Invention

The present invention relates to an apparatus for controlling fuel injection and to a method for controlling fuel injection in an internal combustion engine which includes a first intake passage provided with a first fuel injection valve, and a second intake passage provided with a second fuel injection valve, for each cylinder.

2. Description of Related Art

Japanese Laid-open Patent Publication No. 2010-038102 discloses an internal combustion engine including a first fuel injection valve disposed in a first intake passage and a second fuel injection valve disposed in a second intake passage, and furthermore, discloses a fuel injection control apparatus for an internal combustion engine to inject fuel to the internal combustion engine by using both the first fuel injection valve and the second fuel injection valve.

However, as the fuel injection control apparatus disclosed in the above, in a case in which fuel is injected into the internal combustion engine by using both the first fuel injection valve and the second fuel injection valve, which are disposed in the vicinity of a cylinder, the fuel amount from the fuel injected from each fuel injection valve adhering to an inner wall of an intake passage increases. Furthermore, since more fuel adheres to the inner wall of the intake passage in each cycle, an equilibrium amount of adhering fuel to the inner wall of the intake passage increases.

When the equilibrium amount of adhering fuel to the inner wall of the intake passage is large, fluctuation of an air fuel ratio during transient operation becomes large. Accordingly, there has been a problem of worsening of exhaust emission and fuel consumption performance.

SUMMARY OF THE INVENTION

Therefore, in view of the above-mentioned problem, the present invention has an object to reduces exhaust emission and enhances fuel consumption performance by reducing an equilibrium amount of adhering fuel to an inner wall of an intake passage for an internal combustion engine including a first fuel injection valve disposed in a first intake passage and a second fuel injection valve disposed in a second intake passage.

In order to achieve the above-mentioned object, a fuel injection control apparatus according to the present invention includes a unit which controls fuel injection with a first fuel injection valve and a second fuel injection valve in accordance with an alternative injection mode in which the first fuel injection valve and the second fuel injection valve are alternately switched as a fuel injection valve to be used for fuel injection, every predetermined number of cycles.

Furthermore, a fuel injection control method according to the present invention includes: detecting an operating condition of the internal combustion engine; selecting, as a fuel injection mode, either one of an alternative injection mode in which the first fuel injection valve and the second fuel injection valve are alternately switched as a fuel injection valve to be used for fuel injection, every predetermined number of cycles or a combined injection mode in which fuel is injected to the internal combustion engine by using both the first fuel injection valve and the second fuel injection valve for each cycle, in accordance with the operating condition of the internal combustion engine; and controlling fuel injection with the first fuel injection valve and the second fuel injection valve in accordance with the selected fuel injection mode.

The other objects and features of this invention will become understood from the following description with reference to the accompanying drawings.

BRIEF DESCRIPTION OF THE DRAWINGS

FIG. 15 is a time chart of an example of the injection pattern of the transitional injection mode with the apparatus and the method for controlling fuel injection according to the present invention.

DESCRIPTION OF THE PREFERRED EMBODIMENTS

Figure 1A:
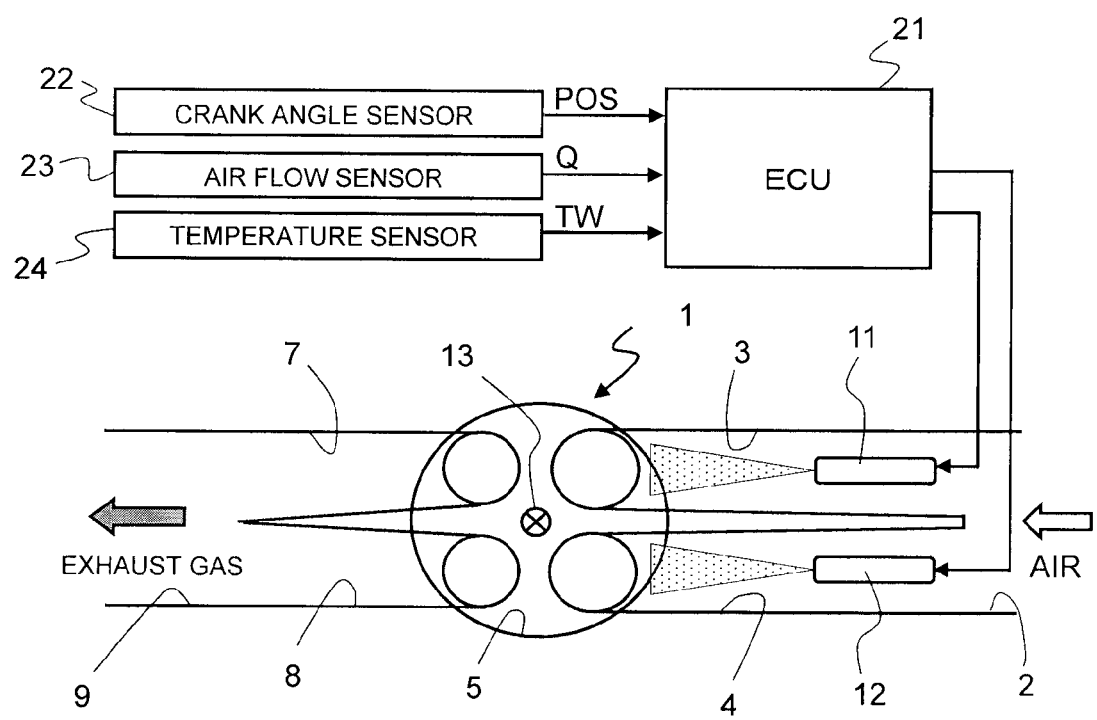
FIGS. 1A and 1B are structural views of an internal combustion engine to which an apparatus and a method for controlling fuel injection according to the present invention are applied.
Figure 1B:
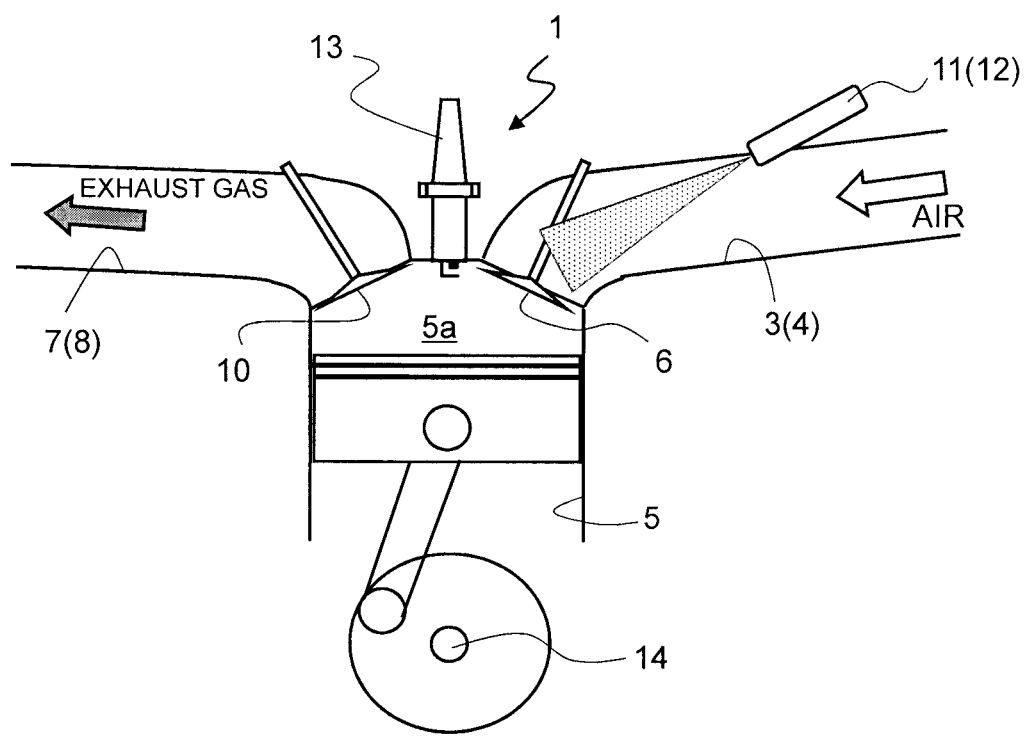

FIGS. 1A and 1B are structural views of an internal combustion engine, in particular, a spark-ignition gasoline engine 1.

In engine 1, at the downstream side of an intake duct 2, intake duct 2 is branched into a first intake port 3 as a first intake passage and a second intake port 4 as a second intake passage. Then, the respective downstream ends of first intake port 3 and second intake port 4 are opened to a cylinder 5 independently.

An intake valve 6 is disposed to each part of first intake port 3 and second intake port 4 being opened to cylinder 5 so as to open and close each opening part of intake ports 3, 4.

On the other hand, upstream ends of a first exhaust port 7 and a second exhaust port 8 which are mutually independent are opened to cylinder 5, and then, first exhaust port 7 and second exhaust port 8 are connected to an exhaust duct 9 as being merged at the downstream side thereof.

An exhaust valve 10 is disposed to each part of first exhaust port 7 and second exhaust port 8 being opened to cylinder 5 so as to open and close each opening part of exhaust ports 7, 8.

A first fuel injection valve 11 is disposed to first intake port 3 and a second fuel injection valve 12 is disposed to second intake port 4. First fuel injection valve 11 injects fuel toward a valve head of intake valve 6 which opens and closes first intake port 3. Second fuel injection valve 12 injects fuel toward a valve head of intake valve 6 which opens and closes second intake port 4.

First fuel injection valve 11 and second fuel injection valve 12 are opened with an injection pulse signal output from an engine control unit (ECU) 21 so as to inject fuel by the amount being proportional to pulse width of the injection pulse signal. Then, the fuel sucked into a combustion chamber 5a of cylinder 5 is combusted as being ignited with spark ignition of an ignition plug 13.

ECU 21 incorporating a microcomputer receives output signals of various sensors which detect operating conditions of engine 1 and outputs injection pulse signals to fuel injection valves 11, 12.

The various sensors include a crank angle sensor 22 which outputs a rotation pulse signal POS being synchronized with rotation of a crank shaft 14 of engine 1, an air flow sensor 23 which outputs a flow rate detection signal indicating an intake air flow rate Q of engine 1, a temperature sensor 24 which outputs a temperature detection signal indicating cooling water temperature TW of engine 1, and the like.

Here, the cooling water temperature TW of engine 1 represents temperature of engine 1.

ECU 21 calculates rotation speed NE (rpm) of engine 1 based on the rotation pulse signal POS and calculates basic injection pulse width TP (ms) based on the engine rotation speed NE and the intake air flow rate Q detected with output of air flow sensor 23.

Furthermore, ECU 21 calculates various correction coefficients CO based on the cooling water temperature TW detected with output of temperature sensor 24, and then, calculates injection pulse width TI (ms) which corresponds to a fuel amount to be injected to each cylinder per cycle by correcting on the basic injection pulse width TP with the various correction coefficients CO.

Here, one cycle of engine 1 includes four strokes of intake, compression, expansion and exhaust.

Then, ECU 21 outputs the injection pulse signal having the injection pulse width TI to the fuel injection valves 11, 12, and controls fuel injection with fuel injection valves 11, 12.

Figure 2:
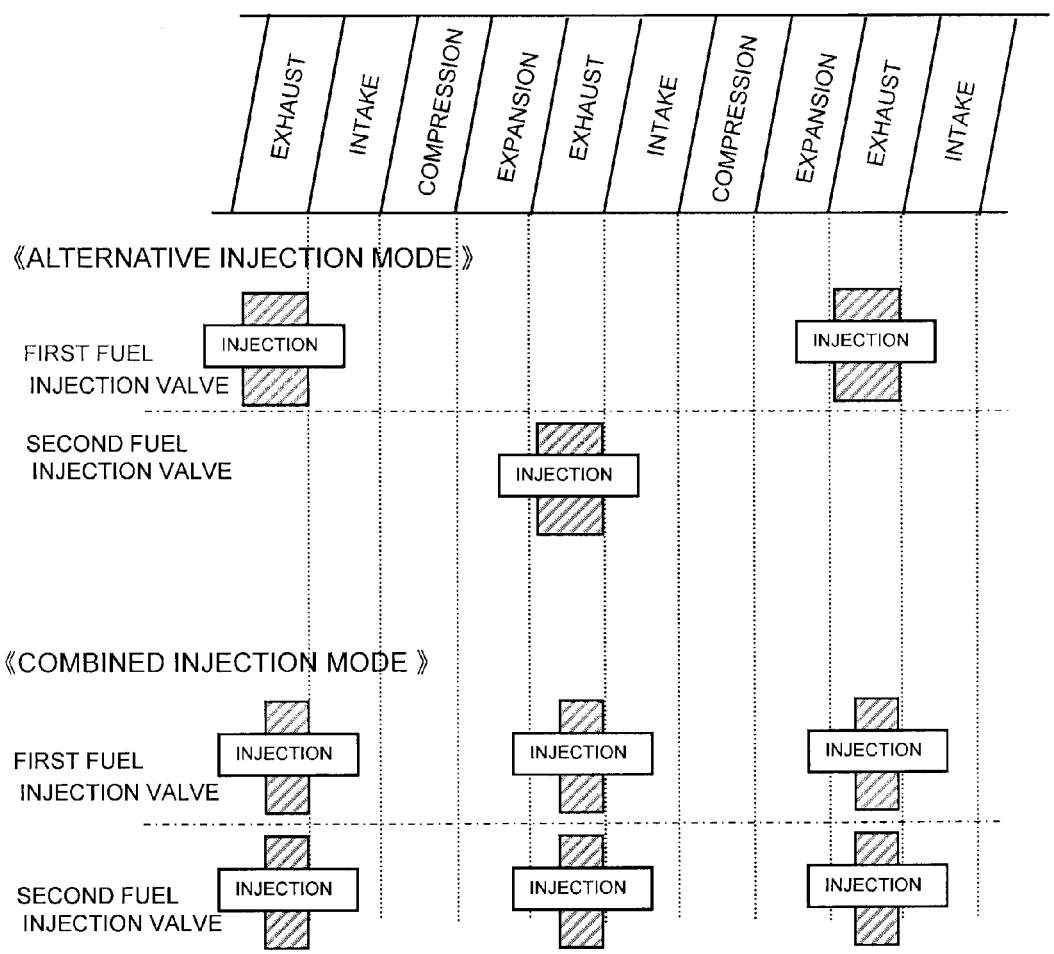
FIG. 2 is a view of an example of an injection pattern in an alternative injection mode and a combined injection mode with the apparatus and the method for controlling fuel injection according to the present invention.

Here, ECU 21 has an alternative injection mode and a combined injection mode as illustrated in FIG. 2 as fuel injection modes for controlling fuel injection with first fuel injection valve 11 and second fuel injection valve 12.

In the example illustrated in FIG. 2, injection by first fuel injection valve 11 and second fuel injection valve 12 is performed at exhaust strokes. However, it is also possible to perform fuel injection at intake strokes.

The alternative injection mode is a mode to inject fuel to engine 1 by alternately operating first fuel injection valve 11 and the second fuel injection valve 12 every predetermined number of cycles. In the alternative injection mode, all amount of the fuel required for forming mixture of a target air-fuel ratio to a cylinder intake air amount per cycle is injected by one of first fuel injection valve 11 and second fuel injection valve 12 and the other thereof is stopped. Then, first fuel injection valve 11 and second fuel injection valve 12 are alternately switched every predetermined number of cycles as the fuel injection valve used for fuel injection.

In the example illustrated in FIG. 2, the fuel injection valve used for fuel injection is switched between first fuel injection valve 11 and second fuel injection valve 12 every one cycle as the predetermined cycle number being one. However, the predetermined cycle number may be two or greater.

In the case in which the predetermined cycle number is set to be two, it is to be repeated to perform fuel injection by second fuel injection valve 12 continuously two times while the first fuel injection valve 11 is stopped after performing fuel injection by first fuel injection valve 11 continuously two times while second fuel injection valve 12 is stopped.

On the other hand, the combined injection mode is a mode to inject fuel to engine 1 by using both first fuel injection valve 11 and second fuel injection valve 12 for every cycle. In the combined injection mode, fuel of the amount required for forming mixture of the target air-fuel ratio to the cylinder intake air amount per cycle is injected by first fuel injection valve 11 and second fuel injection valve 12 as being shared.

That is, in the combined injection mode, fuel is injected by both of first fuel injection valve 11 and second fuel injection valve 12, and then, the sum of fuel injected from fuel injection valve 11 and fuel injected from second fuel injection valve 12 is to be matched with the fuel amount required for forming mixture of the target air-fuel ratio to the cylinder intake air amount per cycle.

In the example illustrated in FIG. 2, a shared amount for first fuel injection valve 11 and a shared amount for second fuel injection valve 12 are equaled, so that a half of the fuel injection amount TI is injected by first fuel injection valve 11 and the remaining half thereof is injected by second fuel injection valve 12.

Here, it is possible to set a share ratio of first fuel injection valve 11 to be different from a share ratio of the second fuel injection valve 12 to thereby set an amount of fuel injected by first fuel injection valve 11 to be greater or lower than an amount of fuel injected by second fuel injection valve 12.

Figure 3:
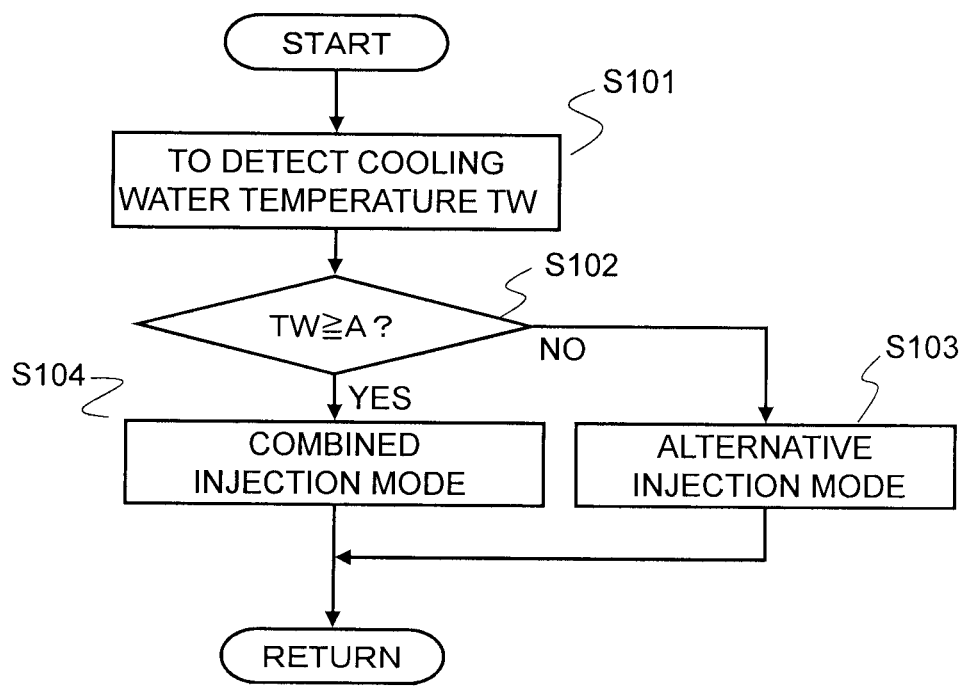
FIG. 3 is a flowchart of an example of selection control of an injection mode with the apparatus and the method for controlling fuel injection according to the present invention.

A flowchart of FIG. 3 illustrates an example of selection control of the fuel injection mode by ECU 21.

In step S101, the cooling water temperature TW is detected based on the output of temperature sensor 24. Here, the cooling water temperature TW is detected as temperature representing the temperature of engine 1. It is also possible to detect temperature of lubricant oil of engine 1, temperature of a cylinder block of the engine 1, and the like.

In step S102, the cooling water temperature TW detected in step S101 is compared with setting temperature A.

The setting temperature A is a threshold value for determining whether engine 1 is in a cold state during warm-up or in a state after warm-up. ECU 21 determines that warm-up of engine 1 is completed when the cooling water temperature TW is equal to or higher than the setting temperature A and that engine 1 is in a cold state and during warm-up when the cooling water temperature TW is lower than the setting temperature A.

When it is determined that engine 1 is in a cold state as cooling water temperature TW being lower than the setting temperature A in step S102, the process proceeds to step S103. In step S103, the alternative injection mode is selected as the fuel injection mode, so that fuel is to be injected to engine 1 as alternately operating first fuel injection valve 11 and second fuel injection valve 12 every predetermined number of cycles.

On the other hand, when, it is determined that engine 1 is in a state in which the warm-up thereof is completed as the cooling water temperature TW being equal to or higher than the set temperature A in step S102, the process proceeds to step S104. In step S104, the combined injection mode is selected as the fuel injection mode, so that fuel is to be injected to engine 1 as using both first fuel injection valve 11 and second fuel injection valve 12 for each cycle.

Figure 4:
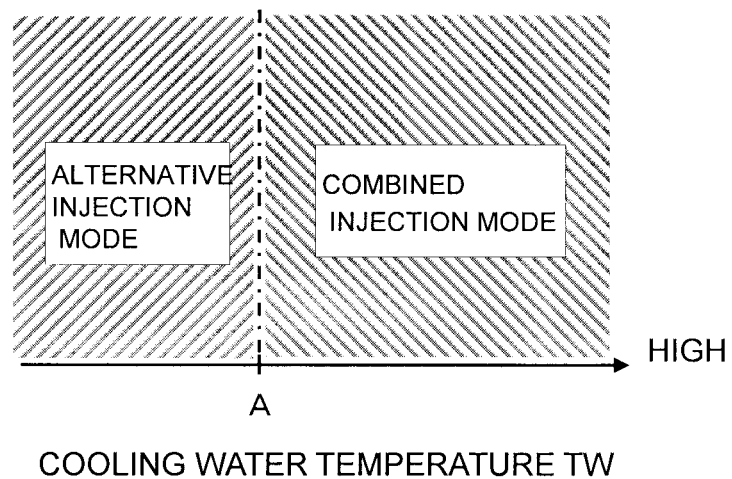
FIG. 4 is a view of switching characteristics of selection control of the injection mode illustrated by the flowchart of FIG. 3.

That is, as illustrated in FIG. 4, fuel injection is performed in the alternative injection mode in the cold state of engine 1 as the cooling water temperature TW being lower than the setting temperature A. Fuel injection is performed in the combined injection mode in a state in which the warm-up of engine 1 is completed as the cooling water temperature TW being equal to or higher than the setting temperature A.

In the alternative injection mode, time between fuel injection by first fuel injection valve 11 or second fuel injection valve 12 and the next fuel injection using the same fuel injection valve is required to be twice of time in the combined injection mode when switching of the fuel injection valve is set to be performed every one cycle. Accordingly, in the alternative injection mode, vaporization time of adhering fuel to a wall face becomes longer than that in the combined injection mode. Therefore, an equilibrium amount of adhering fuel to an inner wall of an intake passage the can be reduced in the alternative injection mode compared to the combined injection mode.

In the cold state of engine 1, fuel is not easily vaporized compared to a state after warm-up. Therefore, when fuel is injected in the combined injection mode in the cold state, the equilibrium amount of adhering fuel to the inner wall of the intake passage becomes large. Accordingly, HC concentration becomes high in exhaust gas of engine 1 owing to flowing of the adhering fuel to the wall face into cylinder 5 as remaining in a liquid form. In contrast, when fuel is injected in the alternative injection mode with less equilibrium amount of adhering fuel in the cold state of engine 1, HC concentration in the exhaust gas of engine 1 can be reduced as the equilibrium amount of adhering fuel being reduced.

On the other hand, after warm-up of engine 1 is completed, fuel is more likely to be vaporized compared to the cold state. Accordingly, it is possible to suppress excess of the equilibrium amount of adhering fuel to the inner wall of the intake passage even when fuel is injected in the combined injection mode. In addition, it is possible to form homogenous mixture and to obtain high combustion stability by introducing fuel into cylinder 5 as dividing respectively through the two intake ports as injecting fuel in the combined injection mode.

In other words, the setting temperature A is previously matched so that a thermal condition in which the equilibrium amount of adhering fuel is sufficiently suppressed in the combined injection mode is detected as being after warm-up and a thermal condition in which the equilibrium amount of adhering fuel becomes excessive in the combined injection mode is detected as being in the cold state.

Figure 5:
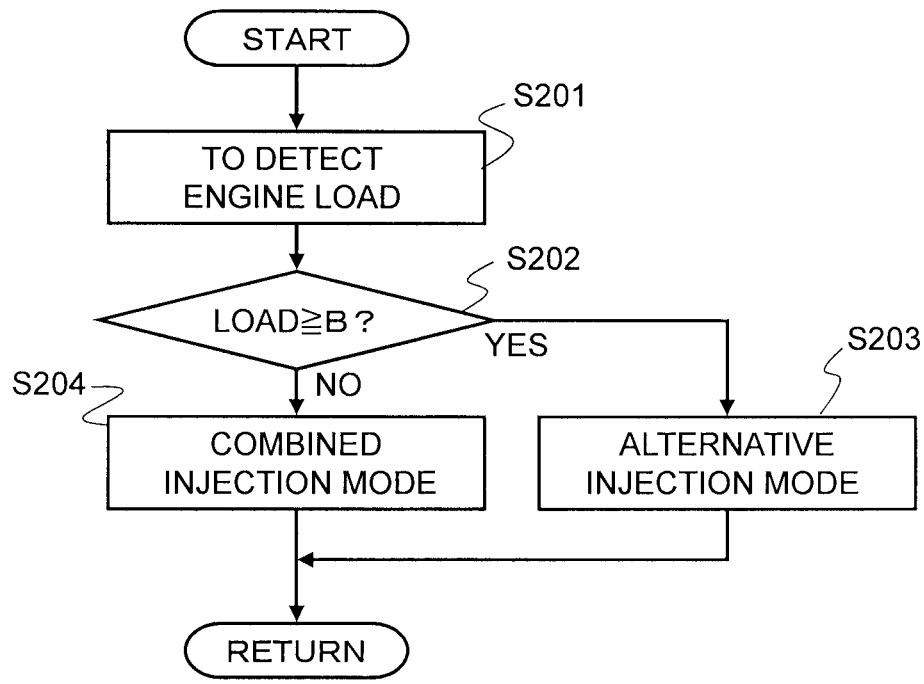
FIG. 5 is a flowchart of an example of selection control of an injection mode with the apparatus and the method for controlling fuel injection according to the present invention.

A flowchart of FIG. 5 illustrates another example of selection control of the fuel injection mode by ECU 21.

Detection of engine load is performed in step S201.

The basic injection pulse width TP can be used as state quantity which indicates the engine load. Alternatively, it is also possible to use negative pressure at an intake pipe, throttle opening, a cylinder intake air amount, and the like.

In step S202, the engine load detected in step S201 is compared with setting load B.

The setting load B is a threshold value for distinguishing between a middle-high load range in which vaporization of the adhering fuel to the wall face is suppressed owing to the pressure in the intake pipe is being close to atmospheric pressure and a low load range including idling in which vaporization of the adhering fuel to the wall face is sufficiently promoted owing to large negative pressure in the intake pipe.

When it is determined that the engine load is in the middle-high load range as being equal to or higher than the setting load B in step S202, the process proceeds to step S203. In step S203, the alternative injection mode is selected as the fuel injection mode, so that fuel is to be injected into engine 1 by alternately operating first fuel injection valve 11 and second fuel injection valve 12, every predetermined number of cycles.

On the other hand, when it is determined that the engine load is in the low load range as being lower than the setting load B in step S202, the process proceeds to step S204. In step S204, the combined injection mode is selected as the fuel injection mode, so that fuel is to be injected to engine 1 by using both first fuel injection valve 11 and second fuel injection valve 12 for each cycle.

Figure 6:
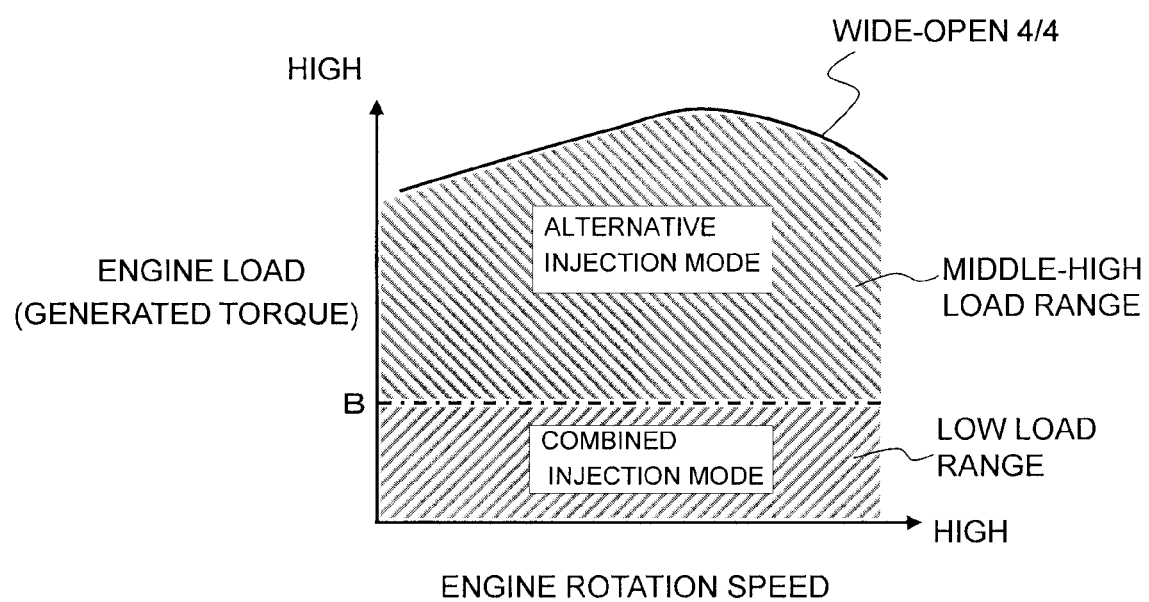
FIG. 6 is a view of switching characteristics of selection control of the injection mode illustrated by the flowchart of FIG. 5.

That is, as illustrated in FIG. 6, the operation range of engine 1 is divided into two as being the low load range and the middle-high load range having the setting load B as the boundary. The combined injection mode is adopted in the low load range and the alternative injection mode is adopted in the middle-high load range.

As described above, in the middle-high load range, vaporization of the adhering fuel to the wall face is suppressed owing to the negative pressure in the intake pipe is being close to the atmospheric pressure. Accordingly, the alternative injection mode which requires the long vaporization time of the adhering fuel is selected to thereby reducing the equilibrium amount of adhering fuel to the inner wall of the intake passage, so that worsening of exhaust emission is suppressed during transitional operation at the middle-high load range.

In the low load range having large negative pressure in the intake pipe, since vaporization of the adhering fuel to the wall face is promoted compared to the middle-high load range, the equilibrium amount of adhering fuel to the inner wall of the intake passage can be sufficiently reduced even when fuel is injected in the combined injection mode. In addition, when fuel is injected in the combined injection mode, it is possible to form homogenous mixture by extending the vaporization time owing to shortened injection time of each fuel injection valve 11, 12 and sucking fuel into cylinder 5 through the respective intake ports 3, 4. Accordingly, it is possible to enhance combustion stability in the low load range by forming homogenous mixture while suppressing the equilibrium amount of adhering fuel.

In other words, the range at the high load side is a range in which exhaust emission worsening is caused as exceeding an acceptable level during transitional operation owing to large equilibrium amount of adhering fuel in the case of injecting in combined injection mode, and the range at the high load side is detected as the middle-high load ranged as exceeding the setting load B. Then, in the middle-high load range, fuel is injected in the alternative injection mode which can reduce the equilibrium amount of adhering fuel.

On the other hand, the range at the low load side is a range in which the equilibrium amount of adhering fuel is suppressed so that exhaust emission is suppressed within the acceptable level during transitional operation even when injection is performed in the combined injection mode, and the range at the low load side is detected as the low load range falling below the setting load B. Then, in the low load range, fuel is injected in the combined injection mode.

Figure 7:
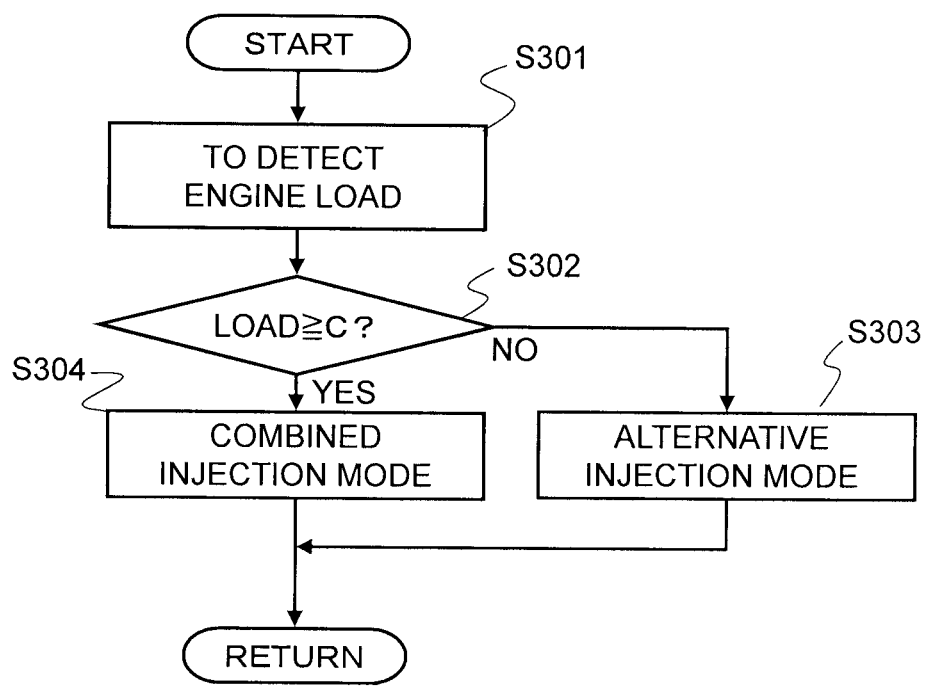
FIG. 7 is a flowchart of an example of selection control of an injection mode with the apparatus and the method for controlling fuel injection according to the present invention.

A flowchart of FIG. 7 illustrates another example of selection control of the fuel injection mode by ECU 21.

Detection of engine load is performed in step S301. The basic injection pulse width TP can be adopted as state quantity which indicates the engine load. Alternatively, it is also possible to adopt negative pressure at the intake pipe, throttle opening, a cylinder intake air amount, and the like.

In step S302, the engine load detected in step S301 is compared with setting load C. Here, the setting load C is greater than the setting load B.

The setting load C is a threshold value for determining whether or not the engine load corresponds to a full load range. The setting load C can be set to be a constant value or a variable value which corresponds to the engine rotation speed NE.

Here, the full load range is a range including full load and the vicinity of full load.

When it is determined that the engine load is in a partial load range which does not correspond to the full load range as being lower than the set load C in step S302, the process proceeds to step S303. In step S303, the alternative injection mode is selected as the fuel injection mode, so that fuel is to be injected into engine 1 by alternately operating first fuel injection valve 11 and second fuel injection valve 12, every predetermined number of cycles.

On the other hand, when it is determined that the engine load is in the full load range as being equal to or higher than the setting load C in step S302, the process proceeds to step S304. In step S304, the combined injection mode is selected as the fuel injection mode, so that fuel is injected to engine 1 by using both first fuel injection valve 11 and second fuel injection valve 12 for each cylinder.

Figure 8:
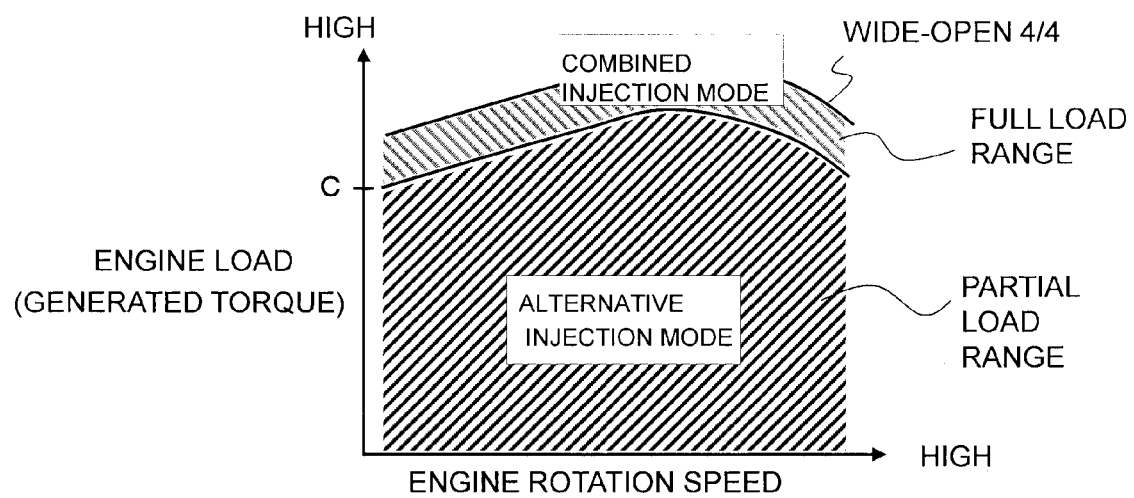
FIG. 8 is a view of switching characteristics of selection control of the injection mode illustrated by the flowchart of FIG. 7.

That is, as illustrated in FIG. 8, the engine operation range is divided in two as being the full load range in which the engine load is equal to or higher than the setting load C and the partial load range in which the engine load falls below the setting load C. The combined injection mode is adopted in the full load range and the alternative injection mode is adopted in the partial load range.

The fuel injection amount increases with increase of the engine load. In the alternative injection mode in which either first fuel injection valve 11 or second fuel injection valve 12 is used, there may be a case in which fuel corresponding to a cylinder intake air amount at that time may not be injected. Accordingly, the setting load C is set so that the range in which fuel shortage occurs in the alternative injection mode can be detected as the full load range.

When fuel is injected in the combined injection mode in the full load range, fuel is injected from both of two fuel injection valves 11, 12 as the injection pulse width TI being shared by two fuel injection valves 11, 12. Accordingly, fuel can be injected by the amount corresponding to the cylinder intake air amount at that time so as to suppress worsening of power output and exhaust temperature increase due to being lean of the air fuel ratio.

On the other hand, in the case of not being in the full load range, the equilibrium amount of adhering fuel to the inner wall of the intake passage is reduced by injecting fuel in the alternative injection mode in which first fuel injection valve 11 and second fuel injection valve 12 are alternately used, so that worsening of exhaust gas emission is suppressed during transitional operation as.

Figure 9:
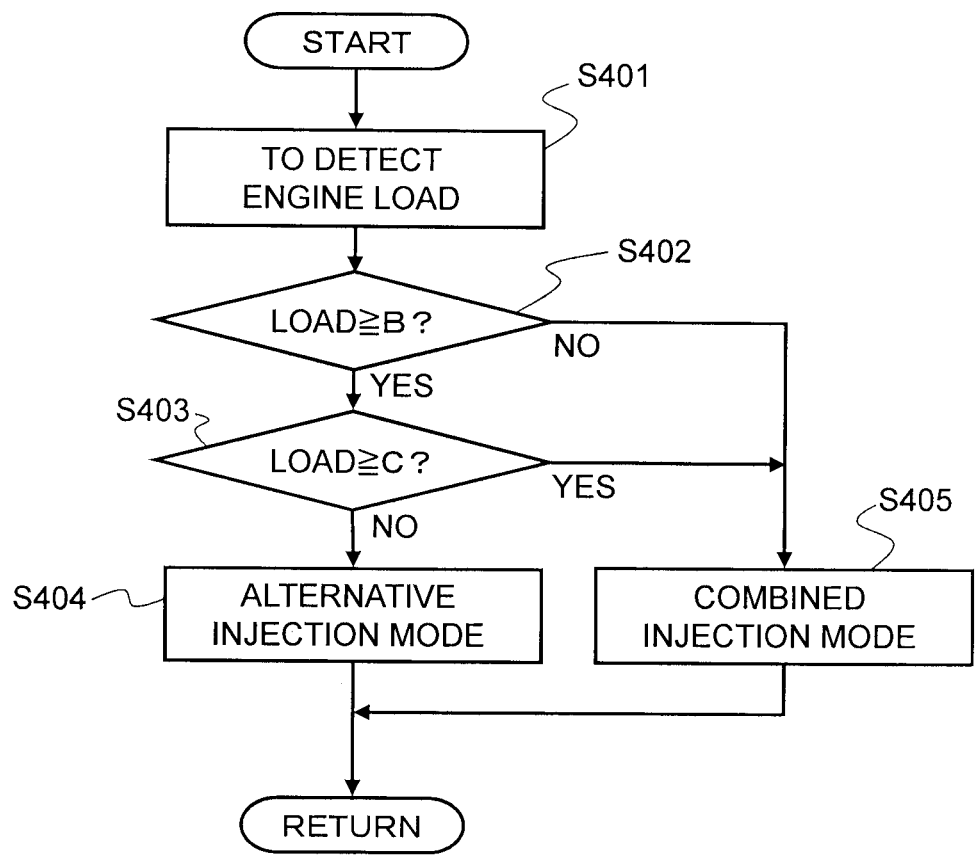
FIG. 9 is a flowchart of an example of selection control of an injection mode with the apparatus and the method for controlling fuel injection according to the present invention.

A flowchart of FIG. 9 illustrates another example of selection control of the fuel injection mode by ECU 21.

Detection of load of the engine 1 is performed in step S401. Next, in step S402, it is determined whether or not the engine load is equal to or higher than the setting load B.

When the engine load is in the low load state as being below the setting load B, the process proceeds to step S405. In step S405, the combined injection mode is selected as the fuel injection mode, so that fuel is injected to engine 1 by using both first fuel injection valve 11 and second fuel injection valve 12 for each cycle.

Here, the setting load B is the similar value to the setting load B used in the control process illustrated in the flowchart of FIG. 5.

In the low load range, since negative pressure in the intake pipe is large, vaporization of the adhering fuel to the wall face is promoted. Accordingly, even when fuel is injected by the same fuel injection valve for each cycle, the equilibrium amount of adhering fuel to the inner wall of the intake passage can be suppressed to a sufficiently small amount. In addition, when fuel is injected in the combined injection mode as being shared by the respective fuel injection valves 11, 12, injection time is shortened and the vaporization time can be extended according to the shortened injection time. Accordingly, it is possible to reduce exhaust emission during transitional operation so that the equilibrium amount of adhering fuel is reduced. Furthermore, in the combined injection mode, since fuel is sucked into cylinder 5 through two intake ports 3, 4, it is possible to form homogenous mixture to thereby enhance combustion stability.

When, in step S402, it is determined that the engine load is equal to or higher than the setting load B and engine 1 is operated in the middle-high load range, the process proceeds to step S403. In step 403, it is determined whether or not the engine load is equal to or higher than the setting load C.

The setting load C is the similar value to the setting value C used in the control process illustrated in the flowchart of FIG. 7.

When engine 1 is operated in the full load range as the engine load being equal to or higher than the setting load C, the process proceeds to step S405. In step S405, the combined injection mode is selected as the fuel injection mode, so that fuel is injected to engine 1 by using both first fuel injection valve 11 and second fuel injection valve 12 for each cycle.

The fuel injection amount becomes the maximum in the full load range. Accordingly, when fuel injection is performed by a single fuel injection valve in the alternative injection mode, there may be a case in which the extended injection time exceeds injection time period in which fuel injection can be performed, so that fuel corresponding to the cylinder intake air amount may not be injected into the cylinder.

On the other hand, in the combined injection mode, since the fuel injection amount corresponding to the cylinder intake air amount is injected by the two fuel injection valves as being shared, injection time of each fuel injection valve is shortened. Accordingly, fuel can be injected into the cylinder by the amount corresponding to the cylinder intake air amount so as to suppress worsening of power output due to fuel supply amount shortage and exhaust temperature increase due to being lean of the air fuel ratio.

When it is determined that the engine load is lower than the setting load C in step S403, the process proceeds to step S404, that is, when engine 1 is operated in a middle load range in which the engine load is equal to or higher than the setting load B and lower than the setting load C. In step S404, the alternative injection mode is selected as the fuel injection mode, so that fuel is injected to engine 1 by alternately operating first fuel injection valve 11 and second fuel injection valve 12, every predetermined number of cycles.

In the middle load range, vaporization of adhering fuel to the wall face is suppressed owing to the pressure in the intake pipe being close to the atmospheric pressure. However, the equilibrium amount of adhering fuel to the inner wall of the intake passage can be reduced and exhaust emission can be reduced during transitional operation in the middle load range by extending the vaporization time as performing the fuel injection in the alternative injection mode.

Figure 10:
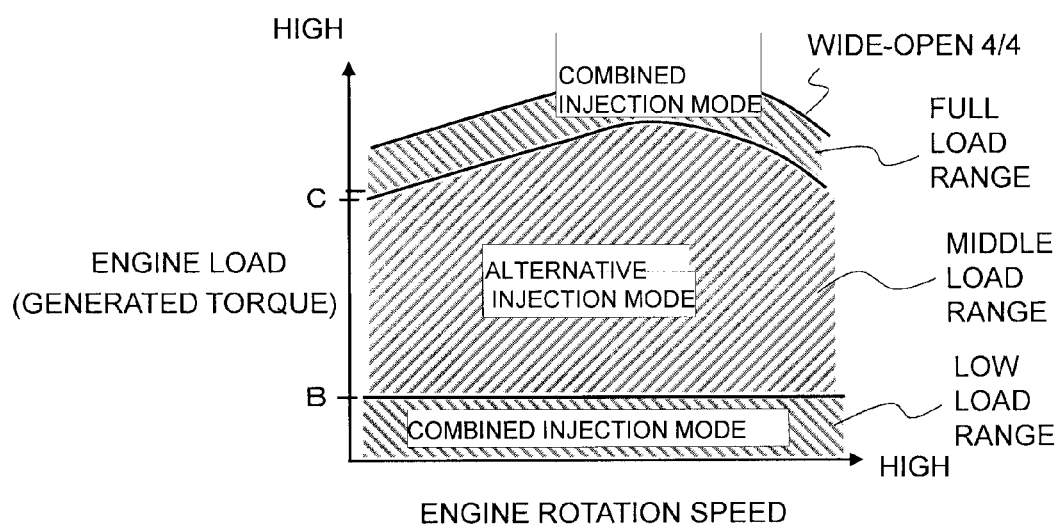
FIG. 10 is a view of switching characteristics of selection control of the injection mode illustrated by the flowchart of FIG. 9.

As illustrated in FIG. 10, in the control process illustrated in the flowchart of FIG. 9, the combined injection mode is adopted in the full load range and the low load range. The alternative injection mode is adopted in the middle range which is sandwiched by the full load range and the low load range.

Here, the combined injection mode is selected in the low load range and in the state after warm-up and the alternative injection mode is selected in the low load range and in the cold state, so that it is also possible to compensate worsening of a vaporization property in the cold state by extending the vaporization time.

Figure 11:
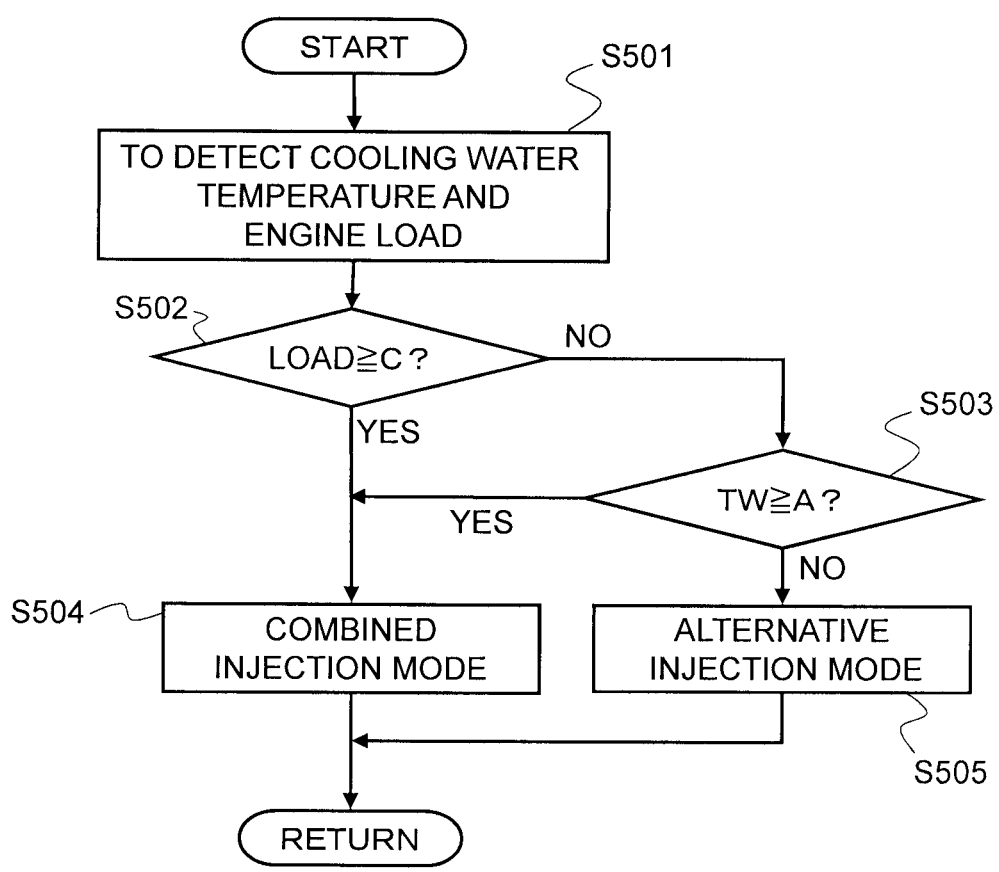
FIG. 11 is a flowchart of an example of selection control of an injection mode with the apparatus and the method for controlling fuel injection according to the present invention.

A flowchart of FIG. 11 illustrates another example of selection control of the fuel injection mode by ECU 21.

In step S501, detection of the engine load and the cooling water temperature TW of engine 1 is performed.

Next, in step S502, it is determined whether or not the engine load is equal to or higher than the setting load C.

When engine 1 is operated in the full load range as the engine load being equal to or higher than the setting load C, the process proceeds to step S504. In step S504, the combined injection mode is selected as the fuel injection mode, so that fuel is injected into engine 1 by using both first fuel injection valve 11 and second fuel injection valve 12 for each cycle.

Here, the setting load C is the similar value to the setting load C used in the control process illustrated in the flowchart of FIG. 7.

The fuel injection amount becomes the maximum in the full load range. Accordingly, when fuel injection is performed by a single fuel injection valve in the alternative injection mode, there may be a case in which the extended injection time exceeds injection time period in which fuel injection can be performed, so that fuel corresponding to the cylinder intake air amount may not be injected into the cylinder.

On the other hand, in the combined injection mode, since the fuel injection amount corresponding to the cylinder intake air amount is injected by the two fuel injection valve as being shared, injection time of each fuel injection valve is shortened. Accordingly, fuel can be injected into the cylinder by the amount corresponding to the cylinder intake air amount so as to suppress worsening of power output due to fuel supply amount shortage and exhaust temperature increase due to being lean of the air fuel ratio.

When it is determined that the engine load is in a low-middle range as being lower than the setting load C, the process proceeds to S503.

In step S503, it is determined whether or not the cooling water temperature TW is equal to or higher than the setting temperature A.

Here, the setting temperature A is the similar value to the setting temperature A used in the control process illustrated in the flowchart of FIG. 3.

When being in a state in which the warm-up is completed as the cooling water temperature TW being equal to or higher than the setting temperature A, the process proceeds to step S504. In step S504, the combined injection mode is selected as the fuel injection mode, so that fuel is injected into engine 1 by using both first fuel injection valve 11 and second fuel injection valve 12 for each cycle.

On the other hand, when being in the cold state as the cooling water temperature TW being lower than the setting temperature A, the process proceeds to step S505. In step S505, the alternative injection mode is selected as the fuel injection mode, so that fuel is injected into engine 1 by alternately operating first fuel injection valve 11 and second fuel injection valve 12, every predetermined number of cycles.

In the alternative injection mode, time between fuel injection by first fuel injection valve 11 or second fuel injection valve 12 and the next fuel injection using the same fuel injection valve is required to be twice of time in the combined injection mode when switching of the fuel injection valve is set to be performed every one cycle. Accordingly, in the alternative injection mode, vaporization time of adhering fuel to the wall face becomes longer than that in the combined injection mode. Therefore, an equilibrium amount of adhering fuel to the inner wall of the intake passage can be reduced in the alternative injection mode compared to the combined injection mode.

In the cold state of engine 1, fuel is not easily vaporized compared to a state after warm-up. Therefore, when fuel is injected in the combined injection mode in the cold state, the equilibrium amount of adhering fuel to the inner wall of the intake passage becomes large. Accordingly, HC concentration becomes high in exhaust gas of engine 1 owing to flowing of the adhering fuel to the wall face into cylinder 5 as remaining in a liquid form. In contrast, when fuel is injected in the alternative injection mode with less equilibrium amount of adhering fuel in the cold state of engine 1, the equilibrium amount of adhering fuel is reduced, so that HC concentration in the exhaust gas of engine 1 can be reduced.

On the other hand, when engine 1 is operated in the partial load range after warm-up is completed, fuel is more likely to be vaporized compared to the cold state. Accordingly, it is possible to suppress excess of the equilibrium amount of adhering fuel to the inner wall of the intake passage even when fuel is injected in the combined injection mode. In addition, when fuel is injected into engine 1 in the combined injection mode, fuel is introduced into cylinder 5 by dividing respectively through the two intake ports. Accordingly, it is possible to form homogenous mixture to thereby obtain high combustion stability.

Figure 12A:
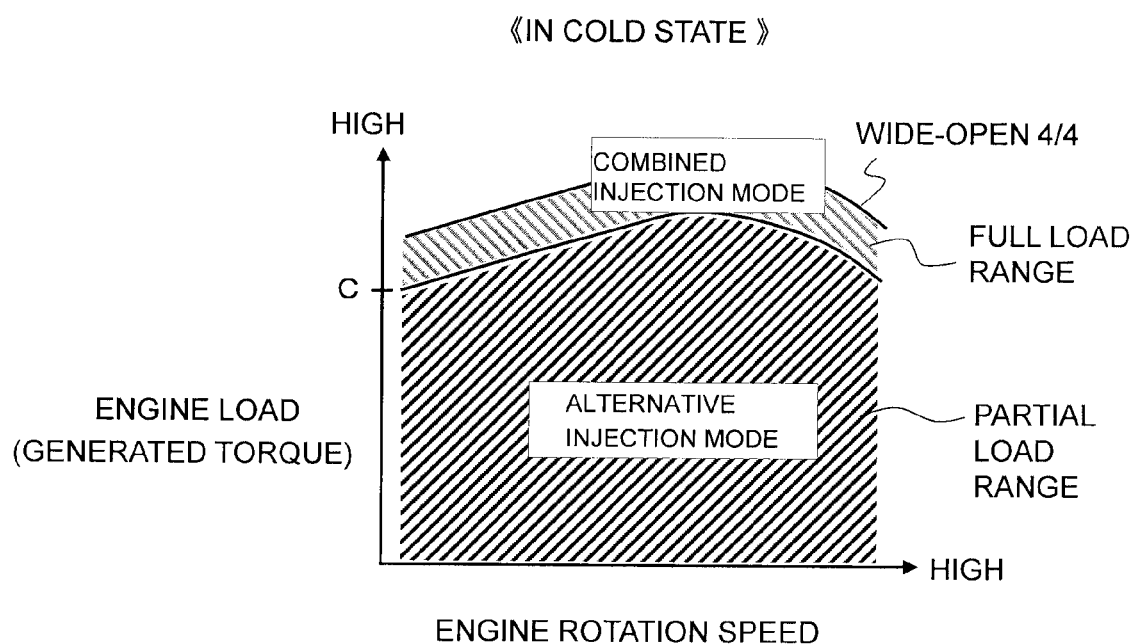
FIGS. 12A and 12B are views illustrating switching characteristics of selection control of the injection mode illustrated by the flowchart of FIG. 11.

In the control process illustrated in the flowchart of FIG. 11, as illustrated in FIG. 12A, in the case in which engine 1 is in the cold state, the combined injection mode is selected in the full load range for ensuring the fuel injection amount and the alternative injection mode is selected in the low-middle load range other than the full load range in order to reduce the equilibrium amount of adhering fuel to the inner wall of the intake passage by extending the vaporization time.

Figure 12B:
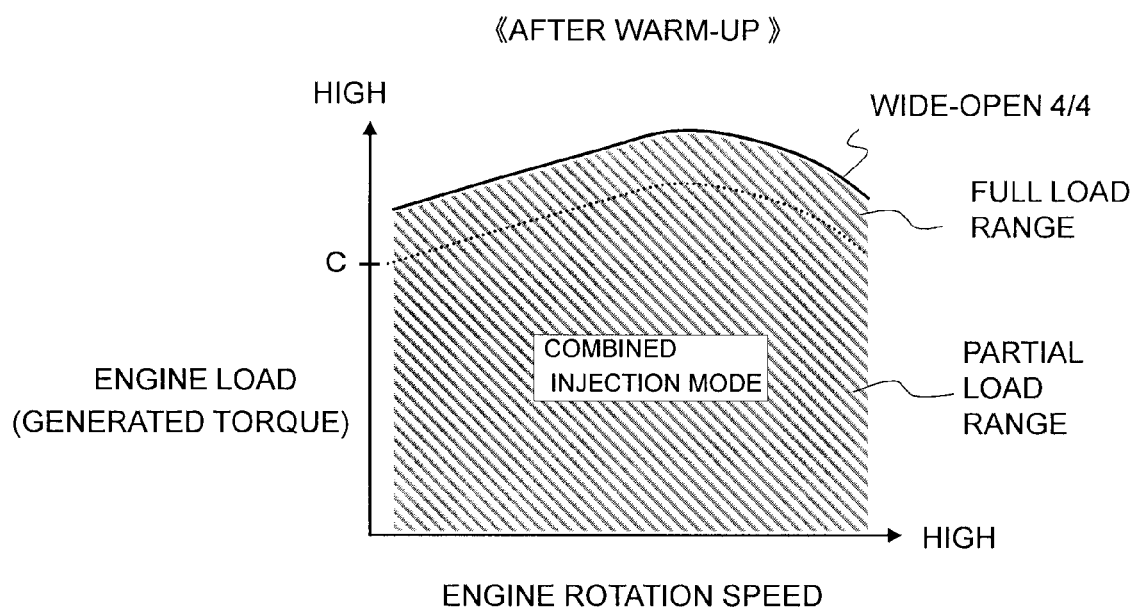

After warm-up of engine 1 is completed, fuel is more likely to be vaporized owing to heat of engine 1. Consequently, it becomes less necessary to extend the vaporization time in the alternative injection mode in the low-middle load range. Accordingly, as illustrated in FIG. 12B, the combined injection mode is selected in all operation ranges including the full load range and the low-middle load range.

When switching between the alternative injection mode and the combined injection mode is performed in accordance with operating conditions of engine 1 such as the cooling water temperature TW and the load, there may be a case in which rapid variation of the equilibrium amount of adhering fuel with the switching causes fluctuation of the air fuel ratio thereby transiently decreasing of combustion stability and worsening of transitional exhaust emission.

Accordingly, it is preferable to suppress rapid variation of the equilibrium amount of adhering fuel with the switching of the fuel injection mode by transiently performing fuel injection in a transitional injection mode which has intermediate characteristics between the alternative injection mode and the combined injection mode during the switching between the alternative injection mode and the combined injection mode.

Figure 13:
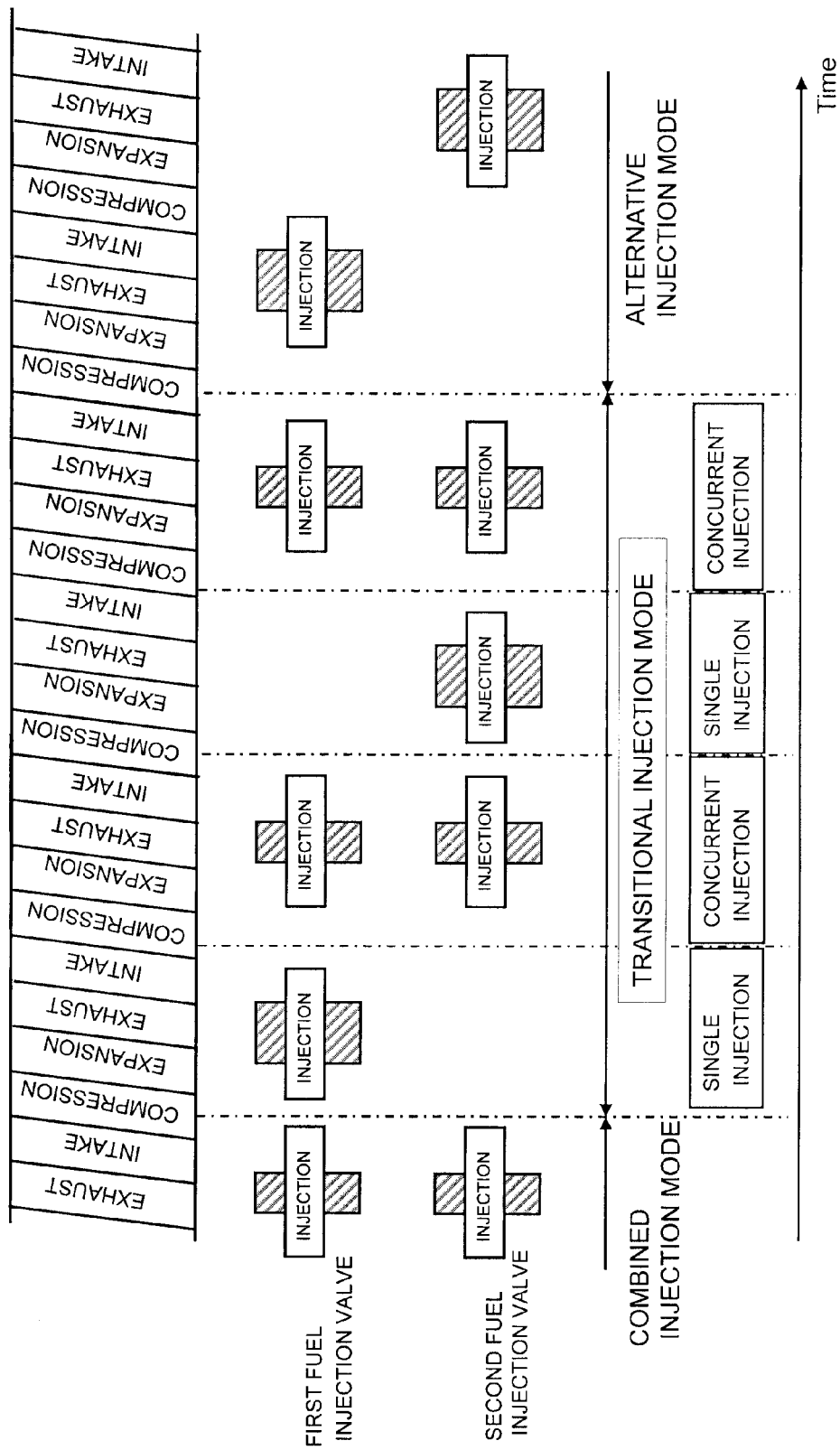
FIG. 13 is a time chart of an example of an injection pattern of a transitional injection mode with the apparatus and the method for controlling fuel injection according to the present invention.

FIG. 13 illustrates an example of the transitional injection mode.

In the transitional injection mode illustrated in FIG. 13, switching is performed for each cycle between the combined injection which uses both first fuel injection valve 11 and second fuel injection valve 12 and single injection which uses either first fuel injection valve 11 or second fuel injection valve 12. Furthermore, in the single injection of the transitional injection mode, first fuel injection valve 11 and second fuel injection valve 12 are alternately switched as the fuel injection valve used for the fuel injection.

Similarly to the combined injection mode, in the combined injection of the transitional injection mode illustrated in FIG. 13, fuel injection amount per cycle is injected as being shared by first fuel injection valve 11 and second fuel injection valve 12. For example, the amount of fuel to be injected by first fuel injection valve 11 is set to be approximately the same as the amount of fuel to be injected by second fuel injection valve 12.

In the case of switching from the combined injection mode to the alternative injection mode, first, the single injection is performed by using first fuel injection valve 11 at the cycle next to that in which the last injection in the combined injection mode is performed. At the subsequent cycle thereto, the combined injection is performed by using both first fuel injection valve 11 and second fuel injection valve 12. At the subsequent cycle thereto, the single injection is performed by using second fuel injection valve 12. At the subsequent cycle thereto, the combined injection is performed by using both first fuel injection valve 11 and second fuel injection valve 12. Then, the alternative injection mode is started at the next cycle.

On the other hand, in the case of switching from the alternative injection mode to the combined injection mode, the combined injection mode is started after performing the combined injection, the single injection by second fuel injection valve, the combined injection and the single injection by first fuel injection valve as reversely following the injection pattern of the above transitional injection mode.

When fuel injection is performed in the transitional injection mode in which the combined injection and the single injection are alternately performed between the combined injection mode and the alternative injection mode, the equilibrium amount of adhering fuel to the inner wall of the intake passage is to be varied to an intermediate amount between those of the combined injection mode and the alternative injection mode. Therefore, variation of the equilibrium amount of adhering fuel becomes gradual compared to a case in which switching is directly performed from the combined injection mode to the alternative injection mode or from the alternative injection mode to the combined injection mode. Accordingly, it is possible to suppress fluctuation of the air fuel ratio caused by the variation of the equilibrium amount of adhering fuel to thereby ensure combustion stability during switching of the fuel injection mode. In addition, worsening of exhaust emission can be suppressed.

Here, in the transitional injection mode, the number of cycles for performing switching between the combined injection and the single injection is not limited to one. It is possible to perform switching every two or three cycles. Furthermore, it is also possible to increase and decrease the number of cycles for performing switching.

Furthermore, for example, it is also possible to perform the single injection continuously two times by switching the fuel injection valve to be used, and thereafter, the single injection is performed continuously two times once again after the combined injection is performed one time. In addition, it is also possible to increase and decrease the number of continuation.

Furthermore, the duration of the transitional injection mode can be set in accordance with operating conditions of engine 1, in particular, under operating conditions in which the equilibrium amount of adhering fuel is large, the duration of the transitional injection mode is longer and under operating conditions in which the equilibrium amount of adhering fuel is small, the duration of the transitional injection mode is shorter or directly switched without the transitional injection mode.

More particularly, as the cooling water temperature TW becomes lower, difficulty of fuel vaporization increases, and thus, it is preferable to extend the duration of the transitional injection mode. Furthermore, as the engine load increases, difficulty of fuel vaporization increases as the intake pipe pressure being close to the atmospheric pressure, it is preferable to extend the duration of the transitional injection mode.

Figure 14:
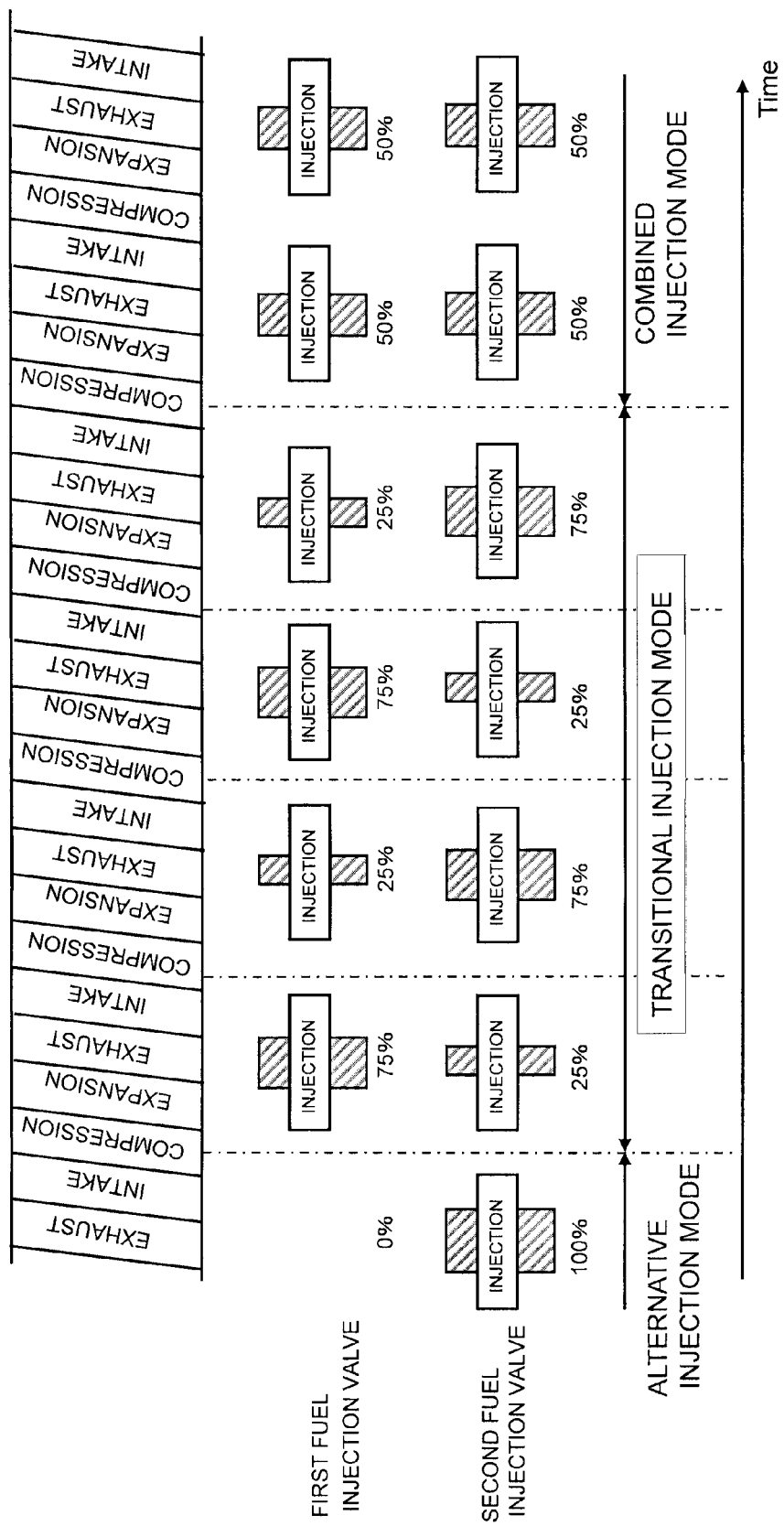
FIG. 14 is a time chart of an example of the injection pattern of the transitional injection mode with the apparatus and the method for controlling fuel injection according to the present invention.

FIG. 14 illustrates another example of the transitional injection mode.

In the transitional injection mode illustrated in FIG. 14, fuel injection is performed by using both first fuel injection valve 11 and second fuel injection valve 12 while the ratio between the fuel injection amount of first fuel injection valve 11 and second fuel injection valve 12 is set to be an intermediate value between the ratio of the alternative injection mode and the ratio of the combined injection mode.

The ratio between a fuel injection amount of first fuel injection valve 11 and a fuel injection amount of second fuel injection valve 12 in the alternative injection mode is 0%:100% or 100%:0%. The ratio between a fuel injection amount of first fuel injection valve 11 and a fuel injection amount of second fuel injection valve 12 in the combined injection mode is 50%:50%. In the transitional injection mode illustrated in FIG. 14, the ratio between a fuel injection amount of first fuel injection valve 11 and a fuel injection amount of second fuel injection valve 12 is set to be 25%:75% or 75%:25%.

Here, switching is performed for each cycle between an injection pattern in which an amount of 75% of a total fuel injection amount is injected by first fuel injection valve 11 and an amount of the remaining 25% thereof is injected by second fuel injection valve 12 and an injection pattern in which an amount of 25% of the total fuel injection amount is injected by first fuel injection valve 11 and an amount of the remaining 75% thereof is injected by second fuel injection valve 12.

In the case of the transitional injection mode illustrated in FIG. 14 as well, the equilibrium amount of adhering fuel to the inner wall of the intake passage is varied to be an intermediate amount between those of the combined injection mode and the alternative injection mode. Therefore, variation of the equilibrium amount of adhering fuel becomes gradual compared to a case in which switching is directly performed from the combined injection mode to the alternative injection mode or from the alternative injection mode to the combined injection mode. Accordingly, it is possible to suppress fluctuation of the air fuel ratio caused by the variation of the equilibrium amount of adhering fuel to thereby ensure combustion stability during switching of the fuel injection mode. In addition, worsening of exhaust emission can be suppressed.

Here, the ratio between the fuel injection amounts of first fuel injection valve 11 and second fuel injection valve 12 in the transitional injection mode is not limited to 25%:75% or 75%:25%, respectively. Furthermore, it is possible to perform fuel injection in the transitional injection mode at the ratio of 75%:25% continuously two times after performing fuel injection at the ratio of 25%:75% continuously two times. Therefore, the number of cycles for switching injection patterns is not limited to one.

Furthermore, in the transitional injection mode illustrated in FIG. 14 as well, the duration thereof can be set in accordance with operating conditions of engine 1, in particular, under operating conditions in which the equilibrium amount of adhering fuel is large, the duration of the transitional injection mode is longer and under operating conditions in which the equilibrium amount of adhering fuel is small, the duration of the transitional injection mode is shorter or directly switched without the transitional injection mode.

Alternatively, it is also possible to gradually vary the ratio between the fuel injection amounts in the transitional injection mode. FIG. 15 illustrates an example of the transitional injection mode having such injection patterns.

In the example illustrated in FIG. 15, when switching is performed from the alternative injection mode to the combined injection mode, the ratio between fuel injection amounts of first fuel injection valve 11 and second fuel injection valve 12 is varied in the order of 90%:10%, 20%:80%, 70%:30%, and 40%:60% in the transitional injection mode. Then, the combined injection mode of which ratio between injection amounts of first fuel injection valve 11 and second fuel injection valve 12 is 50%:50% at a cycle next to the cycle at which injection of 40%:60% is performed.

When the ratio between the fuel injection amounts is gradually varied in the transitional injection mode, the equilibrium amount of adhering fuel can be gradually varied between the equilibrium amount of adhering fuel in the combined injection mode and the equilibrium amount of adhering fuel in the alternative injection mode. Accordingly, variation of the equilibrium amount of adhering fuel can be more gradual during switching of the fuel injection mode.

Here, in the example of switching from the alternative injection mode to the combined injection mode as illustrated in FIG. 15, the last fuel injection in the alternate injection mode is performed by second fuel injection valve 12. Therefore, the fuel injection valve which bears a share of 90% at the first injection in the transitional injection mode is to be first fuel injection valve 11. If the last fuel injection in the alternative injection mode is performed by first fuel injection valve 11, the fuel injection valve which bears a share of 90% at the first injection in the transitional injection mode is to be second fuel injection valve 12.

When switching is performed from the combined injection mode to the alternative injection mode, the ratio between injection amounts of first fuel injection valve 11 and second fuel injection valve 12 is varied in the order of 40%:60%, 70%:30%, 20%:80%, and 90%:10% in the transitional injection mode. If the fuel injection valve which bears a share of 90% at the last fuel injection in the transitional injection mode is first fuel injection valve 11, the fuel injection in the alternative injection mode is started by second fuel injection valve 12. Alternatively, if the fuel injection valve which bears a share of 90% at the last fuel injection in the transitional injection mode is second fuel injection valve 12, the fuel injection in the alternative injection mode is started by first fuel injection valve 11.

Here, steps for varying the injection ratio stepwise are not limited to 10%. Furthermore, the duration of the transitional injection mode can be adjusted by varying steps in accordance with operating conditions of engine 1. It is possible to lessen the steps under operating conditions in which the equilibrium amount of adhering fuel is large and to enlarge the steps or directly perform switching without the transitional injection mode under operating conditions in which the equilibrium amount of adhering fuel is small.

Here, it is possible to use fuel injection valves having the same spray characteristics as first fuel injection valve 11 and second fuel injection valve 12. Alternatively, it is possible to combine fuel injection valves having different spray characteristics such as an injection amount per unit time, a spray angle and spray particle size. In addition, it is also possible to dispose first fuel injection valve 11 and second fuel injection valve 12 having the respective different distance to the intake valve 6.

Furthermore, in the combined injection mode, it is also possible that injection timing of first fuel injection valve 11 and second fuel injection valve 12 is shifted therebetween. In addition, it is also possible that the fuel injection amount of first fuel injection valve 11 and the fuel injection amount of second fuel injection valve 12 are not the same in the combined injection mode.

Furthermore, it is possible to adopt engine rotation speed besides the cooling water temperature TW and the engine load as an operating condition of engine 1 for determining the timing to perform switching between the combined injection mode and the alternative injection mode. Here, the switching timing can be determined based on one of the cooling water temperature, the engine load and the engine rotation speed, or a combination of at least two of the above.

For example, even in the same engine load condition, injection intervals become short and the vaporization time becomes short in a high engine rotation speed range. Therefore, the equilibrium amount of adhering fuel is more likely to be increased compared to that at low rotation speed. Accordingly, for example, it is possible to enlarge the range of the alternative injection mode in which the equilibrium amount of adhering fuel can be reduced at the high rotation speed side by lowering the value of the setting load B illustrated in FIGS. 6 and 10 as the engine rotation speed increases.

The entire contents of Japanese Patent Application NO. 2010-211507, filed Sep. 22, 2010 are incorporated herein by reference.

While only a select embodiment have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention as claimed in the appended claims and their equivalents.

What is claimed is:

1. A fuel injection control apparatus for controlling fuel injection with a first fuel injection valve and a second fuel injection valve in an internal combustion engine including a first intake passage provided with the first fuel injection valve, and a second intake passage provided with the second fuel injection valve, for each cylinder, comprising:

a first unit which controls fuel injection with the first fuel injection valve and the second fuel injection valve in accordance with an alternative injection mode in which the first fuel injection valve and the second fuel injection valve are alternately switched every predetermined number of cycles as a fuel injection valve to be used for fuel injection.

2. The fuel injection control apparatus for an internal combustion engine according to claim 1, further comprising:
a second unit which controls fuel injection with the first fuel injection valve and the second fuel injection valve in accordance with a combined injection mode in which fuel is injected into the internal combustion engine by using both the first fuel injection valve and the second fuel injection valve for each cycle; and
a third unit which selects either the combined injection mode or the alternative injection mode corresponding to an operating condition of the internal combustion engine and operates either the first unit or the second unit in accordance with the selected injection mode.

3. The fuel injection control apparatus for an internal combustion engine according to claim 2,
wherein the third unit selects the combined injection mode in a full load range of the internal combustion engine and selects the alternative injection mode in a range of which load of the internal combustion engine is lower than that of the full load range.

4. The fuel injection control apparatus for an internal combustion engine according to claim 2,
wherein the third unit selects the alternative injection mode in a cold state of the internal combustion engine and selects the combined injection mode after warm-up of the internal combustion engine.

5. The fuel injection control apparatus for an internal combustion engine according to claim 2,
wherein the third unit selects the combined injection mode in a low load range including an idling operation range of the internal combustion engine and selects the alternative injection mode in a range of which load of the internal combustion engine is higher than that of the low load range.

6. The fuel injection control apparatus for an internal combustion engine according to claim 2,
wherein the third unit selects the combined injection mode in a low load range including an idling operation range of the internal combustion engine and in a full load range of the internal combustion engine, and selects the alternative injection mode in a middle load range of which load is lower than that of the full load range and higher than that of the low load range.

7. The fuel injection control apparatus for an internal combustion engine according to claim 2,
wherein the third unit selects the combined injection mode in a full load range of the internal combustion engine, selects the alternative injection mode in a partial load range excluding the full load range while being in a cold state of the internal combustion engine, and selects the combined injection mode in the partial load range after warm-up of the internal combustion engine.

8. The fuel injection control apparatus for an internal combustion engine according to claim 2, further comprising:
a fourth unit which controls fuel injection with the first fuel injection valve and the second fuel injection valve during switching between the alternate injection mode and the concurrent injection mode, in accordance with a transitional injection mode in which single injection to inject fuel by using either the first fuel injection valve or the second fuel injection valve and combined injection to inject fuel by using both of the first fuel injection valve and the second fuel injection valve are switched every predetermined number of cycles.

9. The fuel injection control apparatus for an internal combustion engine according to claim 8,
wherein the fourth unit alternately uses the first fuel injection valve and the second fuel injection valve, as a fuel injection valve to be used for the single injection.

10. The fuel injection control apparatus for an internal combustion engine according to claim 2, further comprising:
a fourth unit which controls fuel injection with the first fuel injection valve and the second fuel injection valve during switching between the alternative injection mode and the combined injection mode, in accordance with a transitional injection mode in which fuel injection is performed as setting a ratio between a fuel injection amount of the first fuel injection valve and a fuel injection amount of the second fuel injection valve to an intermediate value between a ratio of the alternative injection mode and a ratio of the combined injection mode.

11. The fuel injection control apparatus for an internal combustion engine according to claim 10,
wherein the fourth unit varies the ratio every predetermined number of cycles.

12. A fuel injection control apparatus for controlling fuel injection with a first fuel injection valve and a second fuel injection valve for an internal combustion engine including a first intake passage provided with the first fuel injection valve, and a second intake passage provided with the second fuel injection valve, for each cylinder,
the fuel injection control apparatus which controls fuel injection with the first fuel injection valve and the second fuel injection valve in accordance with an alternative injection mode in which the first fuel injection valve and the second fuel injection valve are alternately switched every predetermined number of cycles as a fuel injection valve to be used for fuel injection.

13. A fuel injection control method for controlling fuel injection with a first fuel injection valve and a second fuel injection valve in an internal combustion engine including a first intake passage provided with the first fuel injection valve, and a second intake passage provided with the second fuel injection valve, for each cylinder, comprising the steps of:
detecting an operating condition of the internal combustion engine;
controlling fuel injection with the first fuel injection valve and the second fuel injection valve in accordance with an alternative injection mode in which the first fuel injection valve and the second fuel injection valve are alternately switched every predetermined number of cycles, as a fuel injection valve to be used for fuel injection, in accordance with the operating condition of the internal combustion engine.

14. The fuel injection control method for an internal combustion engine according to claim 13, further comprising:
controlling fuel injection with the first fuel injection valve and the second fuel injection valve in accordance with a combined injection mode in which fuel is injected to the internal combustion engine by using both the first fuel injection valve and the second fuel injection valve for each cycle.

15. The fuel injection control method for an internal combustion engine according to claim 14,
wherein the step of detecting the operating condition includes a step of detecting whether the internal combustion engine is operated in a full load range or is operated in a range of which load is lower than that of the full load range; and the step of selecting the fuel injection mode includes a step of selecting the combined injection mode when the internal combustion engine is operated in the full load range and selecting the alternative injection mode when the internal combustion engine is operated in the range of which load is lower than that of the full load range.

16. The fuel injection control method for an internal combustion engine according to claim 14, wherein the step of detecting the operating condition includes a step of detecting whether the internal combustion engine is in a cold state or in a state in which a warm-up is completed; and the step of selecting the fuel injection mode includes a step of selecting the alternative injection mode when the internal combustion engine is in the cold state and selecting the combined injection mode when the internal combustion engine is in a state in which the warm-up is completed.

17. The fuel injection control method for an internal combustion engine according to claim 14, wherein the step of detecting operating condition includes a step of detecting whether the internal combustion engine is operated in a low load range including an idling operation range or is operated in a range of which load is higher than that of the low load range; and the step of selecting the fuel injection mode includes a step of selecting the combined injection mode when the internal combustion engine is operated in the low load range and selecting the alternative injection mode when the internal combustion engine is operated in the range of which load is higher than that of the low load range.

18. The fuel injection control method for an internal combustion engine according to claim 14, wherein the step of detecting operating condition includes a step of detecting whether the internal combustion engine is operated in a full load range or is operated in a partial load range excluding the full load range, and a step of detecting whether the internal combustion engine is in a cold state or in a state in which a warm-up is completed; and the step of selecting the fuel injection mode includes a step of selecting the combined injection mode when the internal combustion engine is operated in the full load range, selecting the alternative injection mode when the internal combustion engine is operated in the partial load range and the internal combustion engine is in the cold state, and selecting the combined injection mode when the internal combustion engine is operated in the partial load range and the internal combustion engine is in the state in which the warm-up is completed.

19. The fuel injection control method for an internal combustion engine according to claim 14, wherein the step of selecting the fuel injection mode includes a step of selecting a transitional injection mode, during switching between the alternative injection mode and the combined injection mode, in which single injection to inject fuel by using either the first fuel injection valve or the second fuel injection valve and combined injection to inject fuel by using both of the first fuel injection valve and the second fuel injection valve are switched every predetermined number of cycles.

20. The fuel injection control method for an internal combustion engine according to claim 19, wherein the step of selecting the transitional injection mode includes a step of alternately selecting the first fuel injection valve and the second fuel injection valve, as a fuel injection valve to be used for the single injection.

21. The fuel injection control method for an internal combustion engine according to claim 14, wherein the step of selecting the fuel injection mode includes a step of selecting a transitional injection mode, during switching between the alternative injection mode and the combined injection mode, in which fuel injection is performed as setting a ratio between a fuel injection amount of the first fuel injection valve and a fuel injection amount of the second fuel injection valve to an intermediate value between a ratio of the alternative injection mode and a ratio of the combined injection mode.

* * * * *